United States Patent
Ko et al.

(10) Patent No.: US 10,856,129 B2
(45) Date of Patent: Dec. 1, 2020

(54) METHOD AND APPARATUS FOR PERFORMING SHORT RANGE WIRELESS COMMUNICATION IN COMMUNICATION SYSTEM

(71) Applicant: Samsung Electronics Co., Ltd., Gyeonggi-do (KR)

(72) Inventors: Il-Suk Ko, Seoul (KR); Ohyun Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/404,041

(22) Filed: Jan. 11, 2017

(65) Prior Publication Data
US 2017/0202036 A1    Jul. 13, 2017

(30) Foreign Application Priority Data

Jan. 11, 2016    (KR) ......................... 10-2016-0003037

(51) Int. Cl.
| | |
|---|---|
| *H04W 8/00* | (2009.01) |
| *H04W 4/80* | (2018.01) |
| *H04W 4/70* | (2018.01) |
| *H04W 76/10* | (2018.01) |
| *H04W 84/18* | (2009.01) |

(52) U.S. Cl.
CPC ............. *H04W 8/005* (2013.01); *H04W 4/80* (2018.02); *H04W 4/70* (2018.02); *H04W 76/10* (2018.02); *H04W 84/18* (2013.01)

(58) Field of Classification Search
CPC .............. H04B 17/0085; H04B 17/336; H04B 17/345; H04B 1/1027; H04B 1/30
USPC ........................................................ 455/41.2
See application file for complete search history.

(56) References Cited

U.S. PATENT DOCUMENTS

| | | | |
|---|---|---|---|
| 7,761,627 B2 | 7/2010 | Christison et al. | |
| 2010/0131689 A1* | 5/2010 | Kimura ............... | G06F 13/4295 710/106 |
| 2013/0173705 A1* | 7/2013 | Requena ............. | H04L 41/0809 709/204 |
| 2013/0176955 A1* | 7/2013 | Chueh .................. | H04W 76/10 370/329 |

(Continued)

*Primary Examiner* — Ajibola A Akinyemi

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. An operating method of a first electronic device in a communication system is provided. The operating method includes detecting that a setup of a wireless connection with a second electronic device for a short range communication has been started; receiving, from the second electronic device, state information for determining a role of the first electronic device for the wireless connection; determining the role of the first electronic device based on the state information; completing the setup of the wireless connection based on the determined role; and communicating with the second electronic device through the wireless connection based on the determined role.

20 Claims, 16 Drawing Sheets

(56) References Cited

U.S. PATENT DOCUMENTS

| | | | |
|---|---|---|---|
| 2014/0206285 A1* | 7/2014 | Jance | H04W 76/15 455/41.2 |
| 2014/0269658 A1* | 9/2014 | Sadasivam | H04W 4/80 370/338 |
| 2014/0314065 A1* | 10/2014 | Song | H04L 67/16 370/338 |
| 2015/0038080 A1* | 2/2015 | Stroud | H04B 5/0031 455/41.1 |
| 2016/0028832 A1* | 1/2016 | Switkin | H04W 76/14 709/205 |
| 2018/0132092 A1* | 5/2018 | Choi | H04W 48/16 |

* cited by examiner

| ID-Pin | Role |
|---|---|
| Gnd | Host |
| Floating | Peripheral |

METHOD AND APPARATUS FOR PERFORMING SHORT RANGE WIRELESS COMMUNICATION IN COMMUNICATION SYSTEM

CROSS-REFERENCE TO RELATED APPLICATION(S) AND CLAIM OF PRIORITY

The present application is related to and claims the benefit of Korean Patent Application No. 10-2016-0003037, filed on Jan. 11, 2016, the entire disclosure of which is incorporated herein by reference.

TECHNICAL FIELD

The present disclosure relates to a method and apparatus for performing a short range wireless communication in a communication system, and more particularly, to a method and apparatus for substituting a wired connection with a wireless connection using a wireless communication technology in a communication system.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure," "service interface technology," and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

A universal serial bus (USB) is a general interface used for a connection between devices in which high-speed data transmission is possible, and an existing use of the USB has been limited to a wired connection.

A wireless communication technology has been progressed, and a data rate of a wired connection has been substituted with a wireless connection, so a wired connection may be substituted with a wireless connection.

A general connection such as a USB performs a host role managing information and a flow of data for the connection and a role of a peripheral device operated under a control of a host.

In a wired USB connection, a host role and a peripheral device role are mainly classified using a type of a USB cable. That is, in the wired USB connection, a role of a USB device is determined according to a type of a cable, i.e., whether an identifier (ID) pin is grounded.

An existing application in which a wired USB connection is substituted with a wireless connection fixes a role of an electronic device in advance by fixing a value of an ID pin instead of determining a role of a USB based on a type of a cable. In a state in which the role of the electronic device is fixed, a wireless USB connection of the electronic device is established.

In a case that the electronic device needs to perform a host role and a USB device role at the same time or perform the host role and the USB device role alternately according to a usage scenario of the electronic device, the technology of fixing the value of the ID pin may not support the usage scenario. Further, there is no technology of changing a role of a USB during a communication in a case that a wired USB connection is substituted with a wireless connection.

So, in an existing technology, there is a need for manual setting for a USB connection for a docking scenario or data transmission, and it is impossible to automatically connect a service according to a usage scenario and an application of an electronic device. Further, in the existing technology, there are no mechanisms of selecting a USB host role and a USB device role, and no technology of changing a role of a USB. Therefore various scenarios for a USB connection may not be supported.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and an apparatus for performing a short range wireless communication in a communication system.

Another aspect of the present disclosure is to provide a method and an apparatus for substituting a wired USB connection with a wireless connection using a wireless communication technology in a communication system.

Another aspect of the present disclosure is to provide a method and an apparatus for communicating information for determining a role of a USB in a procedure of establishing a wireless connection in a communication system.

Another aspect of the present disclosure is to provide a method and an apparatus for automatically determining a role of an electronic device upon establishing a wireless connection for a short range communication and establishing a service connection in a communication system.

In accordance with an aspect of the present disclosure, an operating method of a first electronic device in a communication system is provided. The operating method includes detecting that a setup of a wireless connection with a second electronic device for a short range communication has been started; receiving, from the second electronic device, state information for determining a role of the first electronic device for the wireless connection; determining the role of the first electronic device based on the state information; completing the setup of the wireless connection based on the determined role; and communicating with the second electronic device through the wireless connection based on the determined role.

In accordance with another aspect of the present disclosure, an operating method of a first electronic device in a communication system is provided. The operating method includes detecting that a setup of a wireless connection with a second electronic device for a short range communication has been started; receiving, from the second electronic device, a message requesting information for determining a role of the second electronic device for the wireless connection; determining the role of the second electronic device corresponding to at least one electronic device if there is the at least one electronic device which is connected to the first electronic device with a wire; transmitting, to the second electronic device, state information indicating the determined role; completing the setup of the wireless connection based on the determined role; and communicating with the second electronic device through the wireless connection based on the determined role.

In accordance with still another aspect of the present disclosure, a first electronic device in a communication system is provided. The first electronic device includes a short range communication interface configured to detect that a setup of a wireless connection with a second electronic device for a short range communication has been started, and to receive, from the second electronic device, state information for determining a role of the first electronic device for the wireless connection; and a processor configured to determine the role of the first electronic device based on the state information, to instruct the short range communication interface to complete the setup of the wireless connection based on the determined role, and to communicate with the second electronic device through the short range communication interface based on the determined role.

In accordance with still another aspect of the present disclosure, a first electronic device in a communication system is provided. The first electronic device includes a short range communication interface configured to detect that a setup of a wireless connection with a second electronic device for a short range communication has been started, and to receive, from the second electronic device, a message requesting information for determining a role of the second electronic device for the wireless connection; and a processor configured to determine the role of the second electronic device corresponding to at least one electronic device if there is the at least one electronic device which is connected to the first electronic device with a wire, to transmit, to the second electronic device, state information indicating the determined role through the short range communication interface, to instruct the short range communication interface to complete the setup of the wireless connection based on the determined role, and to communicate with the second electronic device through the short range communication interface based on the determined role.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figures 1, 2:
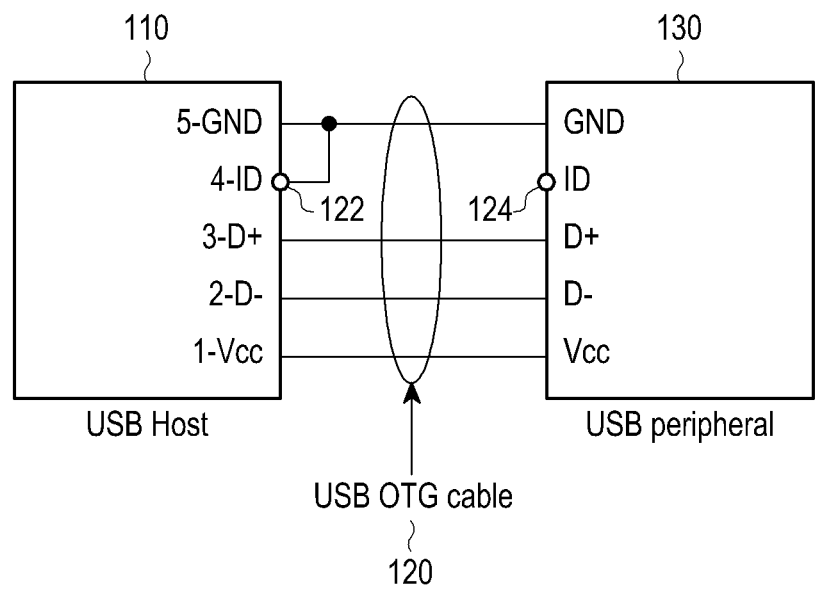
FIG. 1 illustrates an example of a USB communication applicable to embodiments of the present disclosure.
FIG. 2 illustrates an example of a process of determining a role of a USB communication applicable to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, an electronic device may be a transmitting apparatus or a receiving apparatus.

According to various embodiments of the present disclosure, an electronic device may be at least one of a mobile device such as a tablet computer and a smart phone, a station (STA), a user equipment (UE), a wearable device, and an internet over thing (IoT) device.

According to various embodiments of the present disclosure, an electronic device may be a wireless docking pad providing a charging circuit.

An embodiment of the present disclosure provides a method and an apparatus for performing a short range wireless communication in a communication system.

An embodiment of the present disclosure provides a method and an apparatus for substituting a wired universal serial bus (USB) connection with a wireless connection using a wireless communication technology in a communication system.

An embodiment of the present disclosure provides a method and an apparatus for communicating information for determining a role of a USB in a procedure of establishing a wireless connection in a communication system.

An embodiment of the present disclosure provides a method and an apparatus for automatically determining a role of an electronic device upon establishing a wireless connection for a short range communication and establishing a service connection in a communication system.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

An example of a USB communication applicable to embodiments of the present disclosure will be described with reference to FIG. 1.

FIG. 1 illustrates an example of a USB communication applicable to embodiments of the present disclosure.

Referring to FIG. 1, a USB host 110 and a USB peripheral device 130 may establish a wired USB connection using a USB on-the-go (OTG) cable 120.

The USB OTG cable 120 includes five pins, e.g., a ground (GND) pin, an identifier (ID) pin, a D+ pin, a D− pin, and a Vcc pin. Here, a role of a USB device is determined according to whether the ID pin is connected to the GND pin or floated. That is, the USB may be a USB host or a USB peripheral device according to whether the ID pin of the USB device is connected to the GND pin or floated.

An example of a USB communication applicable to embodiments of the present disclosure has been described with reference to FIG. 1, and an example of a process of determining a role of a USB communication applicable to embodiments of the present disclosure will be described with reference to FIG. 2.

FIG. 2 illustrates an example of a process of determining a role of a USB communication applicable to embodiments of the present disclosure.

Referring to FIG. 2, if an ID pin is connected to a GND pin, that is, if the ID pin is grounded, a role of a USB device is a host. If the ID pin is floated, the role of the USB device is a peripheral device.

Referring to an example of a USB communication as shown in FIG. 1, a USB device 110 connected to a grounded ID pin of a cable 120 is a host, and a USB device 130 connected to a floated ID pin is a peripheral. Hereinafter, it will be noted that the term peripheral device will be exchangeable with the term device.

Hereinafter, embodiments of the present disclosure will be described using a USB communication, however, embodiments of the present disclosure may be easily applied to a communication system in which a high-speed wireless communication of Gbps or more at a short range distance which is within centimeters. Further, embodiments of the present disclosure may be applied to all devices and communications for substituting a wired connection which exists already with a wireless connection without considering a distance and a data rate. For example, embodiments of the present disclosure may be applied for a 60 GHz short range wireless communication technology.

An example of a process of determining a role of a USB communication applicable to embodiments of the present disclosure has been described with reference to FIG. 2, and an example of a usage scenario of a USB device applicable to embodiments of the present disclosure will be described with reference to FIG. 3.

Figure 3:
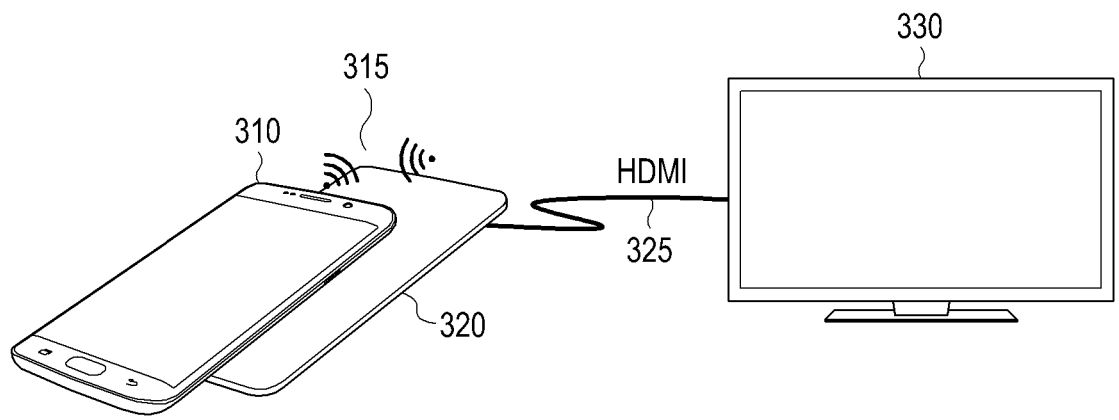
FIG. 3 illustrates an example of a usage scenario of a USB device applicable to embodiments of the present disclosure.

FIG. 3 illustrates an example of a usage scenario of a USB device applicable to embodiments of the present disclosure.

Referring to FIG. 3, an electronic device 310 may establish a wireless USB connection 315 with another electronic device 320. For example, the electronic device 310 may be at least one of a mobile device such as a tablet computer and a smart phone, an STA, a UE, a wearable device, and an IoT device.

For example, the electronic device 320 may be a wireless docking pad providing a charging circuit for the electronic device 310, and relays a connection between the electronic device 310 and a peripheral device 330. For this, a wireless docking pad 320 may be connected to the peripheral device 330 through a wired cable 325 such as a high-definition multimedia interface (HDMI) or a digital video/visual interactive (DVI) or a wireless communication.

In an example in FIG. 3, the wireless docking pad 320 transmits video data provided by the electronic device 310 through a wireless USB connection 315 to a display device as the peripheral device 330 through an HDMI cable 325 thereby the video data is displayed.

In a usage scenario of a USB device for video streaming in FIG. 3, the electronic device 310 operates as a host transmitting image date, and the wireless docking pad 320 operates as a peripheral operating under a control of the host.

An example of a usage scenario of a USB device applicable to embodiments of the present disclosure has been described with reference to FIG. 3, and another example of a usage scenario of a USB device applicable to embodiments of the present disclosure will be described with reference to FIG. 4.

Figure 4:
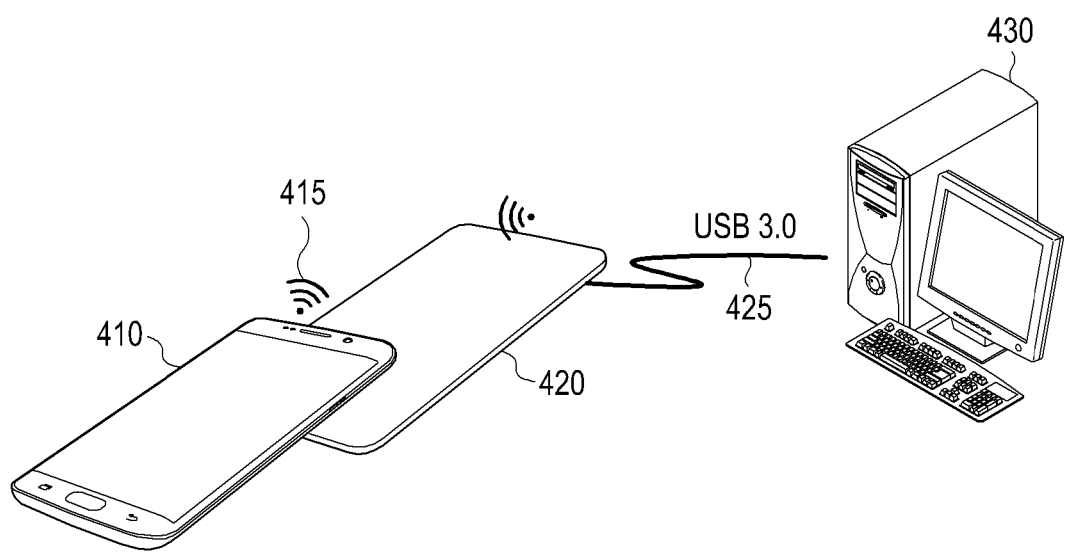
FIG. 4 illustrates another example of a usage scenario of a USB device applicable to embodiments of the present disclosure.

FIG. 4 illustrates another example of a usage scenario of a USB device applicable to embodiments of the present disclosure.

Referring to FIG. 4, an electronic device 410 may establish a wireless USB connection 415 with a wireless docking pad 420. For example, the electronic device 410 may be at least one of a tablet computer, a smart phone or a wearable device, and an IoT device. The wireless docking pad 420 relays a connection between the electronic device 410 and a computer 430.

In a usage scenario of a USB device in FIG. 4, the electronic device 410 operates as an external hard disk (HD) for data backup of the computer 430. For this, the wireless docking pad 420 may be connected to the computer 430 through a wired cable 425, e.g., a USB 3.0 or a wireless communication.

In an example in FIG. 4, the computer 430 transmits backup data through the wired cable 425, and the wireless docking pad 420 stores the backup data at the electronic device 410 through a wireless USB connection 415.

Alternatively, the wireless docking pad 420 reads data stored at the electronic device 410 through the wireless USB connection 415, and the computer 430 receives backup data through the wired cable 425.

In a usage scenario of a USB for data backup in FIG. 4, the wireless docking pad 420 operates as a host of the wireless USB connection 415, and the electronic device 410 operates as a peripheral device.

Another example of a usage scenario of a USB device applicable to embodiments of the present disclosure has been described with reference to FIG. 4, and still another example of a usage scenario of a USB device applicable to embodiments of the present disclosure will be described with reference to FIG. 5.

Figure 5:
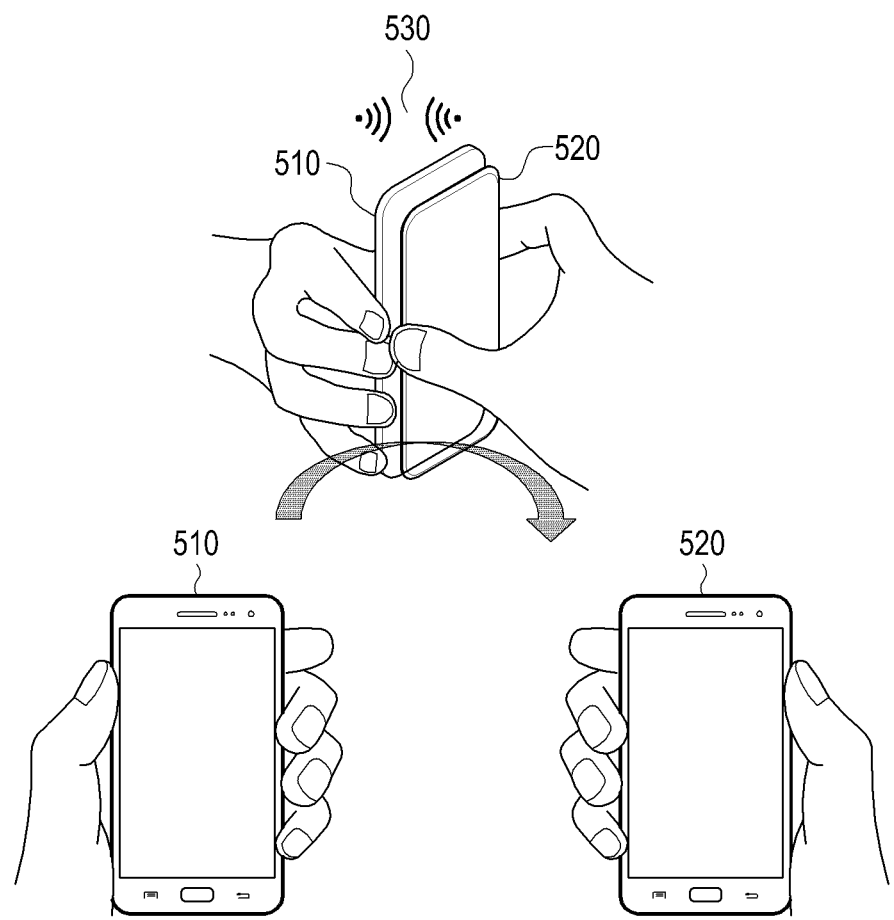
FIG. 5 illustrates yet another example of a usage scenario of a USB device applicable to embodiments of the present disclosure.

FIG. 5 illustrates still another example of a usage scenario of a USB device applicable to embodiments of the present disclosure.

Referring to FIG. 5, the first electronic device 510 may establish a wireless USB connection 530 with the second electronic device 520 through a touch or short range access. That is, each electronic device, i.e., each of the first electronic device 510 and the second electronic device 520 may recognize approach of another device, automatically establish a wireless USB connection, and use a device to device (D2D) service. For example, the electronic devices 510 and 520 may be at least one of a tablet computer, a smart phone or a wearable device, and an IoT device.

A usage scenario of a USB device in FIG. 5 supports a D2D service between the electronic devices 510 and 520, and each of the electronic devices 510 and 520 may perform a host role or a peripheral device role.

Still another example of a usage scenario of a USB device applicable to embodiments of the present disclosure has been described with reference to FIG. 5, and an example of a scenario of supporting a USB connection using a wireless-gigabit (WiGig) technology applicable to embodiments of the present disclosure will be described with reference to FIGS. 6A and 6B.

An example of a WiGig serial extension (WSE) service set (WSS) applicable to embodiments of the present disclosure will be described with reference to FIG. 6A.

Figure 6A:
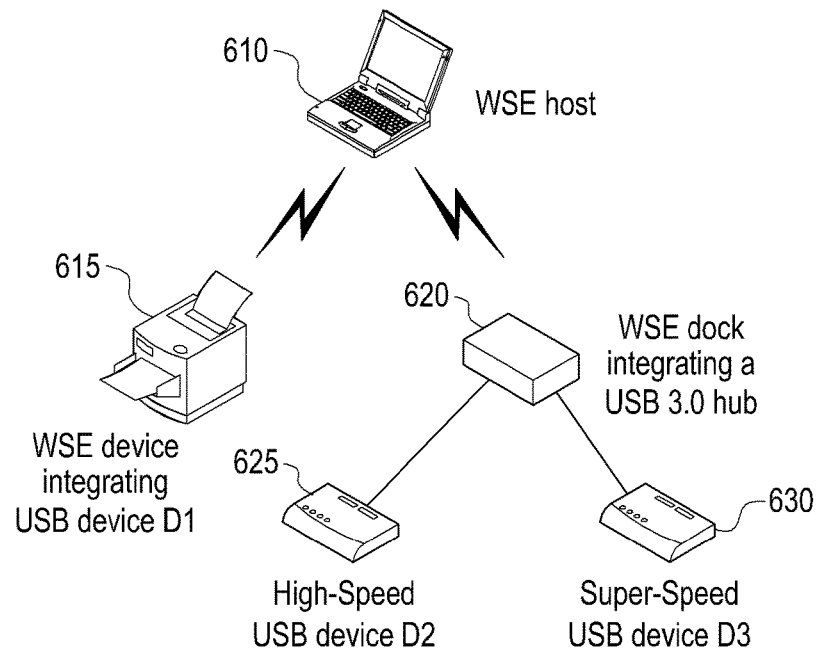
FIG. 6A illustrates an example of a WSS applicable to embodiments of the present disclosure.

FIG. 6A illustrates an example of a WSS applicable to embodiments of the present disclosure.

Referring to FIG. 6A, a WSS includes a WSE host 610 communicating with a WSE device 615 through a WiGig wireless link interface. The WSE host 610 is connected to a plurality of WSE devices, and may control the plurality of WSE devices. The WSE device 615 may include USB ports, and each USB port may be extended into a plurality of ports through an access to a USB device or a USB hub. The WSE device 615 operates as a USB device D1. A WSE docking device 620 wirelessly connected to the WSE host 610 operates as a USB 3.0 hub, and provides USB ports for a connection with a USB device D2 625 and a USB device D3 630.

An example of a WSS applicable to embodiments of the present disclosure has been described with reference to FIG. 6A, and an example of an equivalent USB topology for a WSS applicable to embodiments of the present disclosure will be described with reference to FIG. 6B.

Figure 6B:
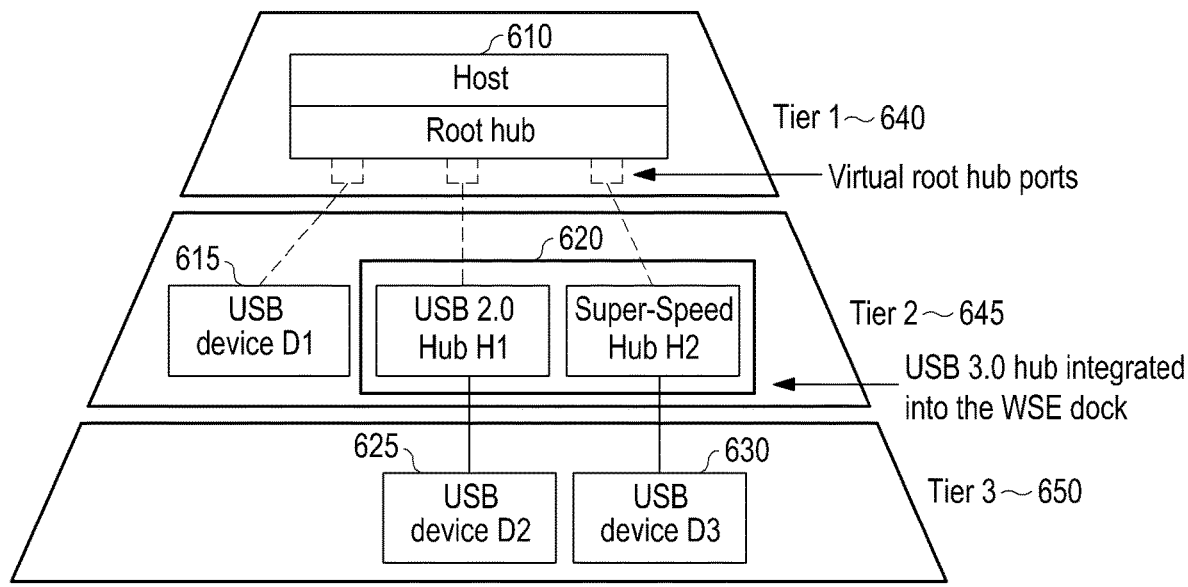
FIG. 6B illustrates an example of an equivalent USB topology for a WSS applicable to embodiments of the present disclosure.

FIG. 6B illustrates an example of an equivalent USB topology for a WSS applicable to embodiments of the present disclosure.

Referring to FIG. 6B, a WSE host 610 configures a tier 1 640 of a USB topology, and includes a host function and a root hub. The root hub provides a plurality of USB ports which may be connected to USB devices 615 and 620.

The USB devices 615 and 620 configure a tier 2 645. A WSE docking device 620 as a USB device within the tier 2 645 provides a USB 2.0 hub port H1 and a super speed hub port H2.

USB devices D2 and D3 625 and 630 within a tier 3 650 may be connected to hub ports H1 and H2 of the WSE docking device 620.

An example of an equivalent USB topology for a WSS applicable to embodiments of the present disclosure has been described with reference to FIG. 6B, and a connection diagram according to a usage scenario in FIGS. 6A and 6B will be described with reference to FIG. 7.

Figure 7:
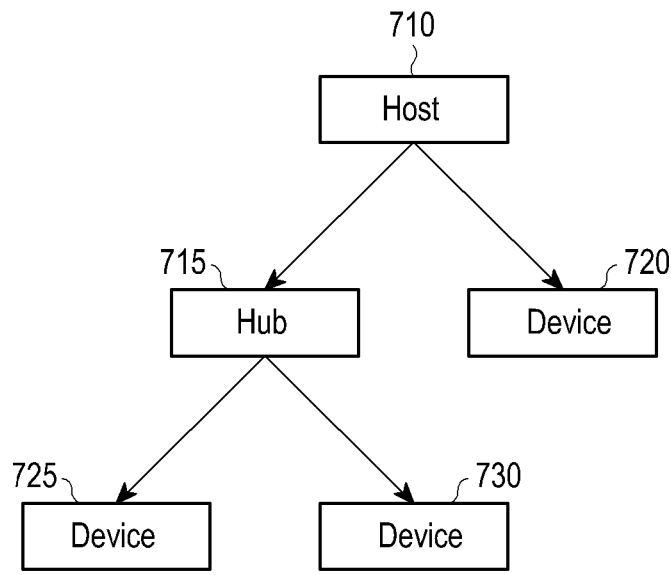
FIG. 7 illustrates a connection diagram according to a usage scenario in FIGS. 6A and 6B.

FIG. 7 illustrates a connection diagram according to a usage scenario in FIGS. 6A and 6B.

Referring to FIG. 7, a host 710 is a WSE host 610 as shown in FIGS. 6A and 6B, and may be, for example, a personal computer. A hub 715 is a WSE docking device 620 as shown in FIGS. 6A and 6B, and connects the host 710 with devices 725 and 730. For example, a device 720 with a direct wireless connection may be a display.

For example, the devices 725 and 730 which may be connected to the host 710 through the hub 715 may be input/output devices such as a mouse or a printer.

In a WSE standard supporting a USB connection using a WiGig wireless technology which uses a 60 GHz band as shown in FIGS. 7, and 6A and 6B, a USB role of each USB device is determined when a USB wireless connection is established.

In a USB or a wireless communication scheme in which a role of a device is determined like the USB, there may be a need for a technology for changing roles of devices while a wireless connection is operated.

In embodiment of the present disclosure to be described, an electronic device communicates information for determining a role of the electronic device in a process of establishing a wireless connection upon detecting a situation in which a wireless communication may be connected in a communication system to automatically determine the role of the electronic device and enable to connect a service while establishing the wireless connection.

An example of a topology of a wireless connection dynamically configurable in a communication system according to an embodiment of the present disclosure will be described with reference to FIG. 8.

Figure 8:
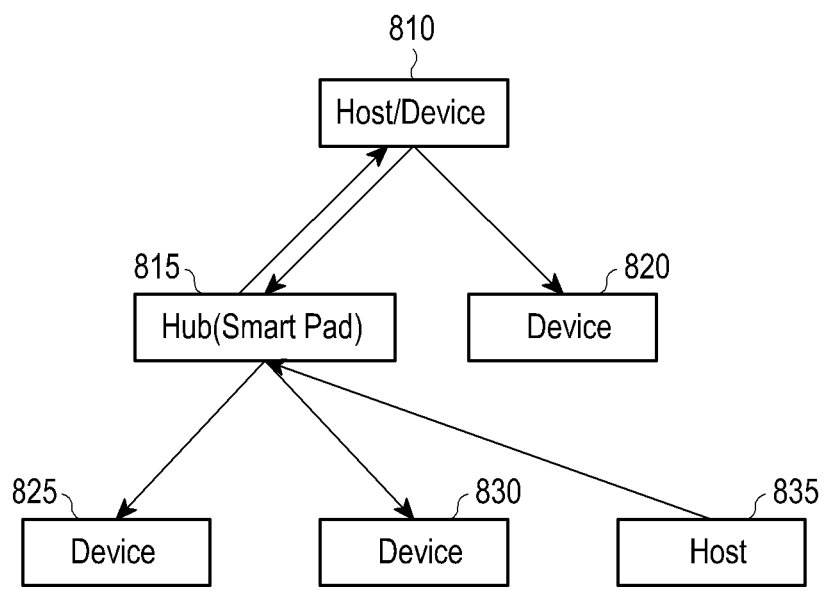
FIG. 8 illustrates an example of a topology of a wireless connection dynamically configurable in a communication system according to an embodiment of the present disclosure.

FIG. 8 illustrates an example of a topology of a wireless connection dynamically configurable in a communication system according to an embodiment of the present disclosure.

Referring to FIG. 8, a host 810 may be, for example, a mobile device such as a smart phone, and a device 820 establishing a direct wireless connection with the host 810 may be, for example, a display.

For example, each of devices 825, 830, and 835 which may be connected to the host 815 through a hub 815 may be a mouse, a printer, a PC, and/or the like.

For example, the hub 815 may be a wireless docking pad 815 which may establish a wireless connection such as a USB with a smart phone as the host 810. The hub 815 establishes a wireless connection with the host 810, and may perform a host role or a peripheral device role for the wireless connection.

Similarly, the host 810 may perform a peripheral device role or a host role for the wireless connection unlike the hub 815. A role of the host 810 and the hub 815 as devices which join a wireless connection may be automatically determined when the wireless connection is established or may be changed while the wireless connection is maintained. For example, the device 810 may operate as a peripheral device, not a host while a device 835 connected to the hub 815 operates as the host.

An example of a topology of a wireless connection dynamically configurable in a communication system according to an embodiment of the present disclosure has been described with reference to FIG. 8, and an example of a scenario using a wireless connection in a communication system according to an embodiment of the present disclosure will be described with reference to FIG. 9.

Figure 9:
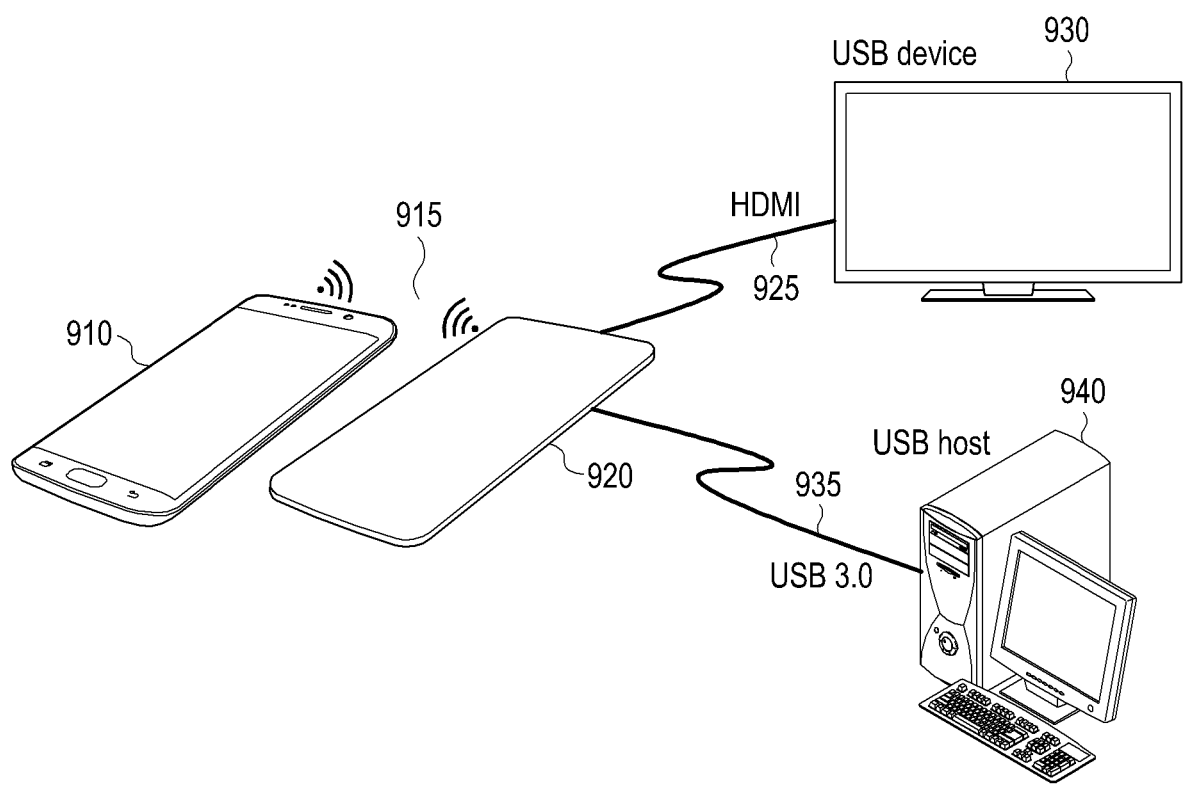
FIG. 9 illustrates an example of a scenario using a wireless connection in a communication system according to an embodiment of the present disclosure.

FIG. 9 illustrates an example of a scenario using a wireless connection in a communication system according to an embodiment of the present disclosure.

Referring to FIG. 9, an electronic device 910 may establish a wireless connection 915 with a wireless docking pad 920. For example, the wireless connection 915 may be a wireless USB connection. For example, the electronic device 910 may be at least one of a tablet computer, a smart phone or a wearable device, and an IoT device.

The wireless docking pad 920 provides a charging circuit for the electronic device 910, and/or relays a connection between the electronic device 910 and a peripheral device 930 or a connection between the electronic device 910 and a computer 940. For this, wireless docking pad 920 may be connected to the peripheral device 930 such as a wired cable 925, e.g., an HDMI, and/or may be connected to the computer 940 through a wired cable 935 such as USB 3.0.

In an example of FIG. 9, the wireless docking pad 920 may transmit video data provided by the electronic device 910 through the wireless connection 915 to the display 930 through the HDMI cable 925. In this case, the electronic device 910 operates as a host, and the wireless docking pad 920 operates as a peripheral device.

The wireless docking pad 920 stores backup data transferred from the computer 940 through the USB cable 935 at the electronic device 910 through the wireless connection 915. In this case, the wireless docking pad 920 operates as a host, and the electronic device 910 operates as a peripheral device.

An example of a scenario using a wireless connection in a communication system according to an embodiment of the present disclosure has been described with reference to FIG. 9, and an example of a configuration of a wireless docking pad supporting a multi-wireless connection in a communication system according to an embodiment of the present disclosure will be described with reference to FIG. 10.

Figure 10:
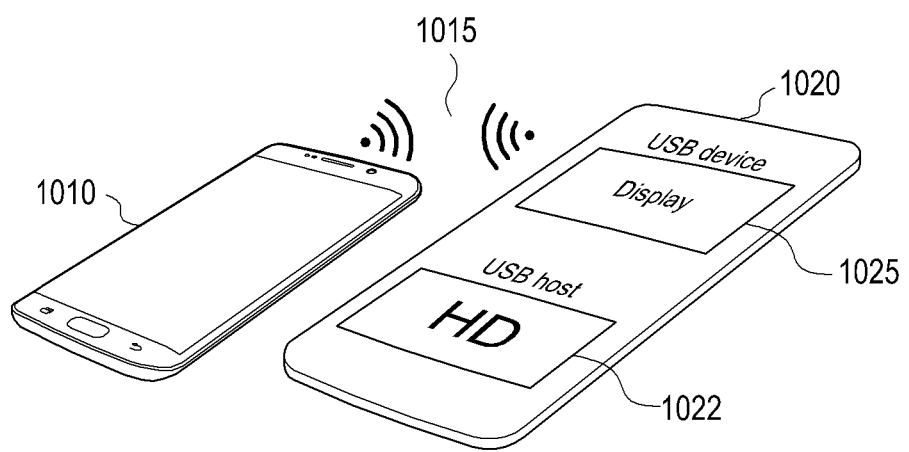
FIG. 10 illustrates an example of a configuration of a wireless docking pad supporting a multi-wireless connection in a communication system according to an embodiment of the present disclosure.

FIG. 10 illustrates an example of a configuration of a wireless docking pad supporting a multi-wireless connection in a communication system according to an embodiment of the present disclosure.

Referring to FIG. 10, the first electronic device 1010 may establish a wireless connection 1015 with the second electronic device 1020. For example, the wireless connection 1015 may be a wireless USB connection.

For example, the first electronic device 1010 may be at least one of a tablet computer, a smart phone, a wearable device, and an IoT device.

The second electronic device 1020 may be, for example, a wireless docking pad or a peripheral device. The second electronic device 1020 may include a hard disk 1022 which operates as a host, and/or an internal display 1025 which operates as a peripheral device for the wireless connection 1015 with the first electronic device 1010.

Meanwhile, if a USB connection of an electronic device 920 which may support a connection with various devices as described in FIG. 9 or an electronic device 1020 with an internal display 1025 and a hard disc 1022 is wirelessly established, each of the electronic devices 920 and 930 may automatically determine a role suitable for each service scenario.

For determining and/or changing a role of a wireless connection, an electronic device may manage at least one of the following state information:

Connection port and device state for a wireless USB communication;

State of a service providable through a wireless USB communication; or

Service context information.

The service context information may be, for example, information related to a used application, information indicating whether a video is played, and/or the like.

The state information is exchanged between electronic devices in a process in which the electronic devices are connected.

An example of a configuration of a wireless docking pad supporting a multi-wireless connection in a communication system according to an embodiment of the present disclosure has been described with reference to FIG. 10, and an example of a procedure of establishing a wireless connection including exchange of state information in a communication system according to an embodiment of the present disclosure will be described with reference to FIG. 11.

Figure 11:
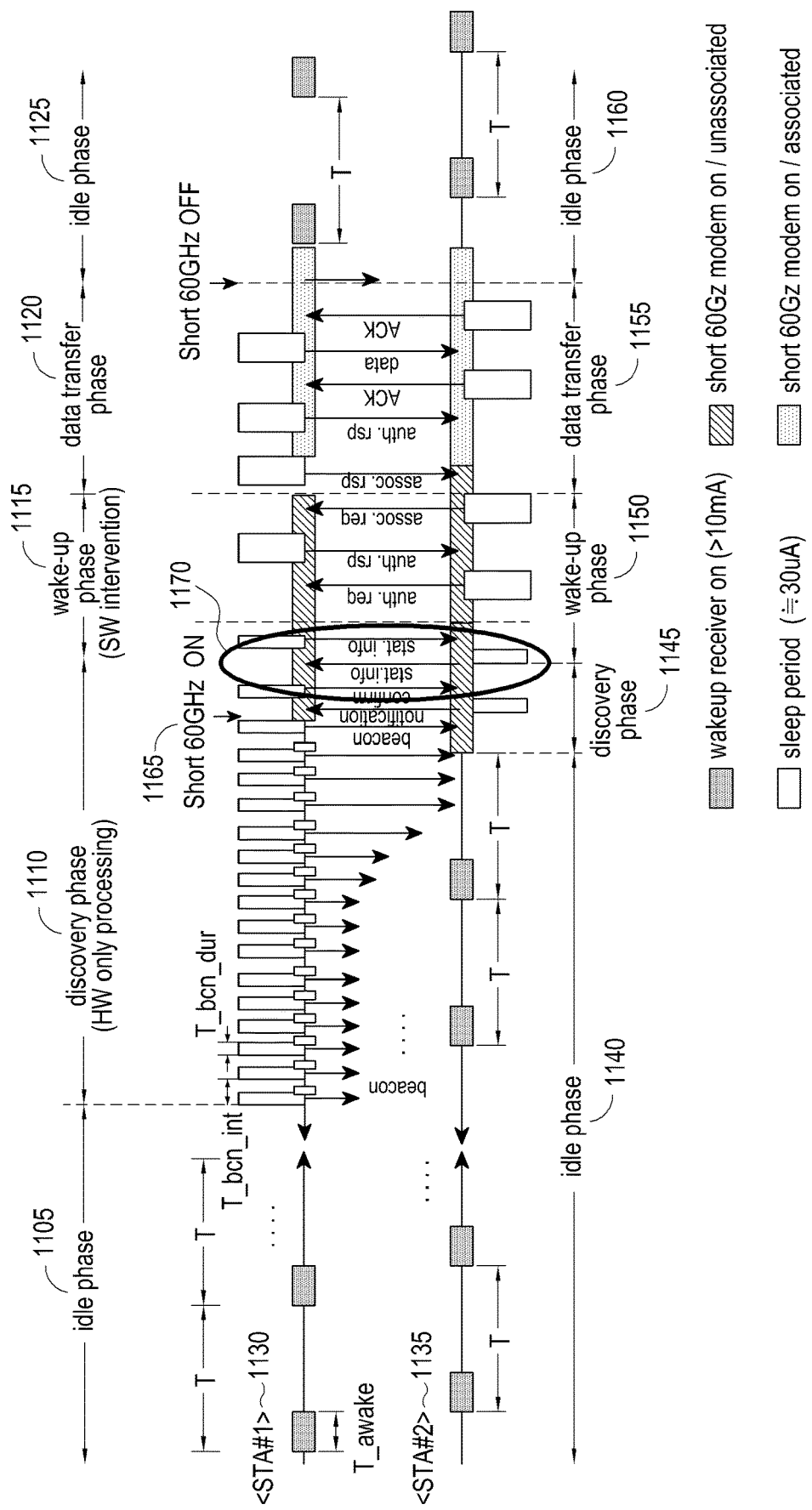
FIG. 11 illustrates an example of a procedure of establishing a wireless connection including exchange of state information in a communication system according to an embodiment of the present disclosure.

FIG. 11 illustrates an example of a procedure of establishing a wireless connection including exchange of state information in a communication system according to an embodiment of the present disclosure.

Referring to FIG. 11, it will be noted that an example of a procedure of establishing a wireless connection including exchange of state information is a procedure in which a wireless USB connection is established and data is exchanged between an STA #1 1130 and an STA #2 1135. In various embodiments of the present disclosure, it will be noted that the term STA will be interchangeable with the mobile station (MS), terminal, and/or the like.

In FIG. 11, the STA #1 1130 wakes up from an idle state 1105 by a predetermined period, e.g., a period T and during a predetermined time interval, e.g., a time interval T_awake to monitor whether there is a received signal. If there is no received signal during the time interval T_awake, the STA #1 1130 maintains the idle state until start of the next period T.

The STA #2 1135 performs a signal monitoring operation at an idle state 1140 by a predetermined period, e.g., a period T and a predetermined time interval, e.g., a time interval T_awake.

In a case that there is a need for establishing a wireless connection such as a case traffic data to be transmitted in the STA #1 1130 occurs, a case that there is traffic data to be transmitted in the STA #1 1130, or a case that there is data which the STA #1 1130 intends to receive, the STA #1 1130 transitions into a discovery state 1110 and transmits a reference signal, e.g., a beacon signal by a preset time interval, e.g., a time interval T_bcn_int and during a time duration, e.g. a time duration T_bcn_dur. If a response signal for the beacon signal is not received even though the beacon signal has been transmitted predetermined times, the beacon signal may be transmitted with power which is increased compared to the previous transmission power.

For example, the STA #2 1135 may detect at least one of beacon signals from the STA #1 1130 through a short range approach to the STA #1 1130. The STA #2 1135 powers on a communication interface for a short range communication, transitions into a discovery state 1145, and transmits a beacon notification signal on the discovery state 1145.

The STA #1 1130 powers on a communication interface for a short range communication at operation 1165 and transmits a confirmation signal to the STA #2 1135.

The STA #2 transmits, to the STA #1 1130, a state information message necessary for determining a role of a wireless connection before transitioning into a wake-up state 1150 at operation 1170.

The STA #1 1130 transmits a state information message of the STA #1 1130 to the STA #2 1135 before transitioning into a wake-up state 1115 at operation 1170. In FIG. 11, the transmission of the state information message from the STA #2 1135 is performed before the transmission of the state information message from the STA #1 1130 is performed. However, the transmission of the state information message from the STA #1 1130 may be performed before the transmission of the state information message from the STA #2 1135 is performed, or the transmission of the state information message from the STA #1 1130 and the transmission of the state information message from the STA #2 1135 may be performed at the same time.

The STA #2 1135 transmits a request message for authentication during a wake-up state 1150 and the STA #1 1130 transmits a response message to the request message for the authentication during a wake-up state 1115.

The STA #2 1135 transmits a request message for association of a wireless connection, and the STA #1 1130 transmits a response message to the request message for the association of the wireless connection thereby completing establishment of the wireless connection.

The STA #1 1130 transmits data on a data transfer state 1120 to the STA #2 1135 which is on a data transfer state 1155, and receives an acknowledgement (ACK) message to the data from the STA #2 1135. Upon completing data transmission or detecting that the STA #2 1135 becomes out of a communication range for a short range communication, the STA #1 1130 releases a wireless access, powers off a communication interface for the short range communication, and transitions into an idle state 1125.

If there is no data transmission from the STA #1 1130, the STA #2 1135 releases a wireless access and transitions into an idle state 1160.

An example of a procedure of establishing a wireless connection including exchange of state information in a communication system according to an embodiment of the present disclosure has been described with reference to FIG. 11, and an example of a state information message transmitted by an STA in a procedure of establishing a wireless connection in a communication system according to an embodiment of the present disclosure will be described with reference to FIG. 12.

Figure 12:
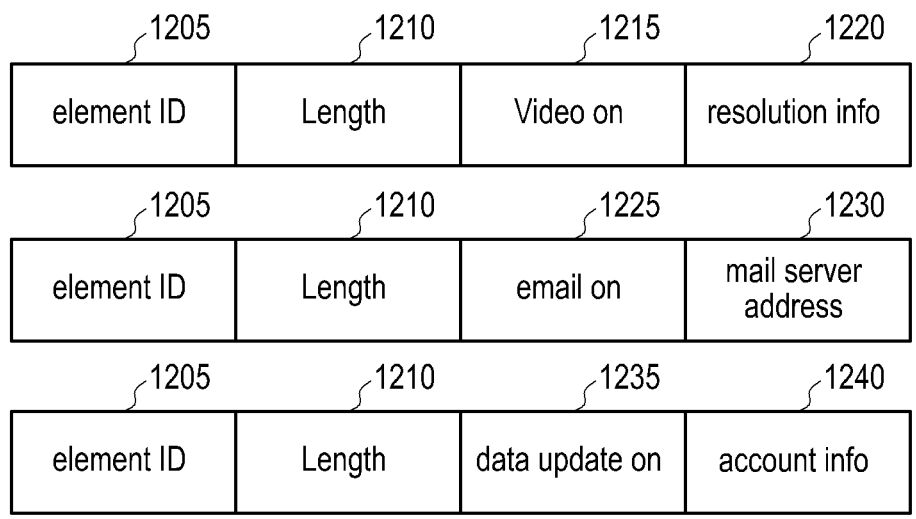
FIG. 12 illustrates an example of a state information message transmitted by an STA in a procedure of establishing a wireless connection in a communication system according to an embodiment of the present disclosure.

FIG. 12 illustrates an example of a state information message transmitted by an STA in a procedure of establishing a wireless connection in a communication system according to an embodiment of the present disclosure.

Referring to FIG. 12, a state information message includes an element ID field 1205 indicating an element ID for identifying a device transmitting the state information message, a length field 1210 indicating information for a length of the state information message, and at least one field 1215, 1220, 1225, 1230, 1235, and 1240 indicating state information to be used for determining a role of a wireless connection.

The state information may be at least one of a video on field 1215 indicating that video data is played, a resolution information field 1220 indicating resolution information for the video data, an email on field 1225 indicating transmission of email data, a mail server address field 1230 indicating a mail server address related to the email data, a data update on field 1235 indicating that backup data is transmitted, and an account information field 1240 indicating account information related to the backup data.

An example of a state information message transmitted by an STA in a procedure of establishing a wireless connection in a communication system according to an embodiment of the present disclosure has been described with reference to FIG. 12, and another example of a state information message transmitted by an STA or a wireless docking pad in a procedure of establishing a wireless connection in a communication system according to an embodiment of the present disclosure will be described with reference to FIG. 13.

Figure 13:
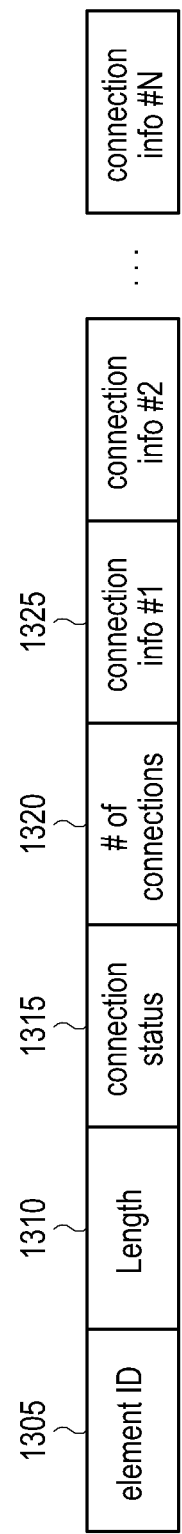
FIG. 13 illustrates another example of a state information message transmitted by an STA or a wireless docking pad in a procedure of establishing a wireless connection in a communication system according to an embodiment of the present disclosure.

FIG. 13 illustrates another example of a state information message transmitted by an STA or a wireless docking pad in a procedure of establishing a wireless connection in a communication system according to an embodiment of the present disclosure.

Referring to FIG. 13, a state information message includes an element ID field 1305 indicating an element ID for identifying a device transmitting the state information message, a length field 1310 indicating information on a length of the state information message, a connection state field 1315 indicating a connection state related to a wireless connection, No. of connections field 1320 indicating the number of connections which may be maintained through a wireless connection, and a connection information field 1325 indicating connection information for each connection.

For example, each connection information field 1325 may include a field informing that an image device in which video data transmission is possible has been connected to a port, e.g., an HDMI or a DVI, and/or a field informing that a computer in which a data connection is possible has been connected to a port, e.g., a USB or an Ethernet.

In various embodiments of the present disclosure, an electronic device may determine a role of the electronic device using a service currently used and state information for the electronic device, or transmit the state information to an opponent electronic device. For example, upon establishing a wireless connection with an opponent electronic device while playing video, an electronic device implemented as a smart phone transmits, to the opponent electronic device, a video on field as state information of the electronic device.

The opponent electronic device may automatically recognize intention of a wireless connection as video streaming and determine a role of the opponent electronic device. In this case, the electronic device determines a role of the electronic device as a host role, and the opponent electronic device determines a role of the opponent electronic device as a peripheral device role.

For another example, in a case that it is determined that there is a need for data backup if a new picture or video file is stored at a storage of an electronic device implemented as a smart phone, or the number or capacity of pictures or video files reaches a preset threshold value, the electronic device includes a data update on field into state information to transmit the state information to an opponent electronic device upon establishing a wireless connection.

The electronic device and the opponent electronic device automatically determine a role for the wireless connection using the state information. In this case, based on the state information, the electronic device determines a role of the electronic device as a peripheral device role and the opponent electronic device performs a host role.

For still another example, an electronic device may transmit or request state information to an opponent electronic device instead of determining a role of the electronic device, and receive, from the opponent electronic device, information on a determined role as a response to the transmission or request of the state information to identify and determine the role of the electronic device. For convenience, information on a role will be referred to as role information. For example, only an electronic device which operates as a host may transmit role information. For another example, at least one of two electronic devices which set a wireless connection may transmit role information.

In a scenario in FIG. 9, all of a display apparatus 930 and a computer 940 which operates as an external hard disk are connected to a wireless docking pad 920, so the wireless docking pad 920 may perform all of a host role and a peripheral device role for connections. For example, the wireless docking pad 920 may perform a peripheral device role for the first connection of a video streaming related to the display apparatus 930 and perform a host role for the second role of data backup related to the computer 940.

The wireless docking pad 920 includes role information indicating a role of the wireless docking pad 920 or a role of an opponent electronic device for each role into state information to transmit the state information to an electronic device 910, and the electronic device 910 may determine a role of the electronic device 910 for each connection based on the role information.

Alternatively, if the electronic device 910 directly determines the role of the electronic device 910, there is no need for the transmission of the role information, so the electronic device 910 directly determines the role of the electronic device 910 using state information.

Another example of a state information message transmitted by an STA or a wireless docking pad in a procedure of establishing a wireless connection in a communication system according to an embodiment of the present disclosure has been described with reference to FIG. 13, and an example of a procedure of establishing a wireless connection in a communication system according to an embodiment of the present disclosure will be described with reference to FIG. 14.

Figure 14:
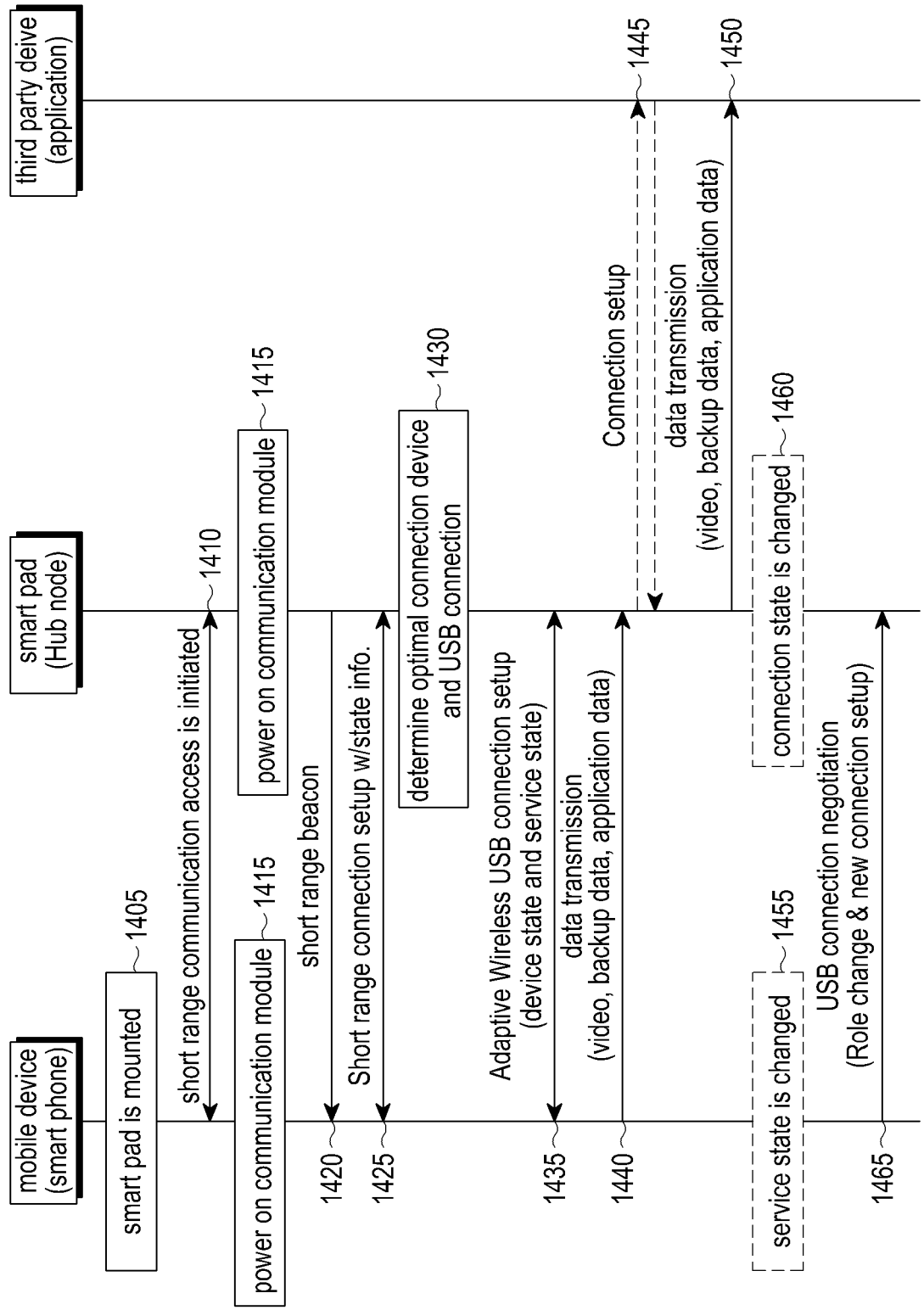
FIG. 14 illustrates an example of a procedure of establishing a wireless connection in a communication system according to an embodiment of the present disclosure.

FIG. 14 illustrates an example of a procedure of establishing a wireless connection in a communication system according to an embodiment of the present disclosure.

Referring to FIG. 14, it will be noted that a procedure of establishing a wireless connection in FIG. 14 is an example of a procedure of establishing a wireless connection between a mobile device such as a smart phone and a smart pad such as a wireless docking pad. Here, a smart pad may operate a hub providing a connection for an external device such as a computer.

In FIG. 14, a mobile device is mounted on a smart pad at operation 1405 and a wireless connection for a short range communication is started at operation 1410. Here, a wireless connection may be initiated by one of a charging coil, an out of band (00B) signal, an embedded sensor, and an in band signal. A mobile device and a smart pad power on a communication interface for a short range communication at operation 1415, and the smart pad starts transmitting a beacon signal for setting a link at operation 1420.

The mobile device and the smart pad acquire state information such as device information and service information of an opponent device in a procedure of establishing a wireless connection for a short range communication at operation 1425. For example, the state information may be configured as described in FIG. 12 or FIG. 13. The smart pad selects at least one appropriate device among devices connected to the smart pad, and determines a role for the wireless connection using state information of the smart pad and/or state information of the opponent device at operation 1430.

The smart pad adaptively completes setup of the wireless connection by considering the selected device, the determined role, and a service state, e.g., a video on field, an email on field, and/or the like of the mobile device at operation 1435. After the setup of the wireless connection has been completed, each of the mobile device and the smart pad performs an operation of exchanging at least one of video data, backup data, and application data according to the determined role of each of the mobile device and the smart pad at operation 1440.

If necessary, the smart pad sets up a connection with the device selected at operation 1430, e.g., a display apparatus or a computer at operation 1445, and transmits at least one of the video data, the backup data, and the application data to the device at operation 1450.

While the wireless connection between the mobile device and the smart pad is maintained, a service state of the mobile device may be changed at operation 1455 or a connection state of the smart pad may be changed at operation 1460. For example, video play may be stopped in the mobile device, or a connection with the display apparatus may be released in the smart pad.

Upon detecting that the service state or the connection state is changed, a corresponding device may perform a role changing operation and a new connection setup operation through connection negotiation at operation 1465.

For example, if a service state of the mobile device is changed, the mobile device transmits state information on the changed service state to the smart device while performing a new connection setup operation. Then, each of the mobile device and the smart pad may determine a role for a new connection of each of the mobile device and the smart pad based on the state information.

For example, if the smart pad detects that a connection state is changed, the smart pad transmits state information on the changed connection state to the mobile device while performing a new connection setup operation. Similarly, each of the mobile device and the smart pad may determine a role for a new connection of each of the mobile device and the smart pad based on the state information.

A mobile device, a smart, and a computer may dynamically configure a topology of a wireless connection as described in FIG. 8 based on a procedure as described in FIG. 14.

Although FIG. 14 illustrates an example of a procedure of establishing a wireless connection in a communication system according to an embodiment of the present disclosure, various changes could be made to FIG. 14. For example, although shown as a series of operations, various operations in FIG. 14 could overlap, occur in parallel, occur in a different order, or occur multiple times.

An example of a procedure of establishing a wireless connection in a communication system according to an embodiment of the present disclosure has been described with reference to FIG. 14, and an example of an operating process of an electronic device in a communication system according to an embodiment of the present disclosure will be described with reference to FIG. 15.

Figure 15:
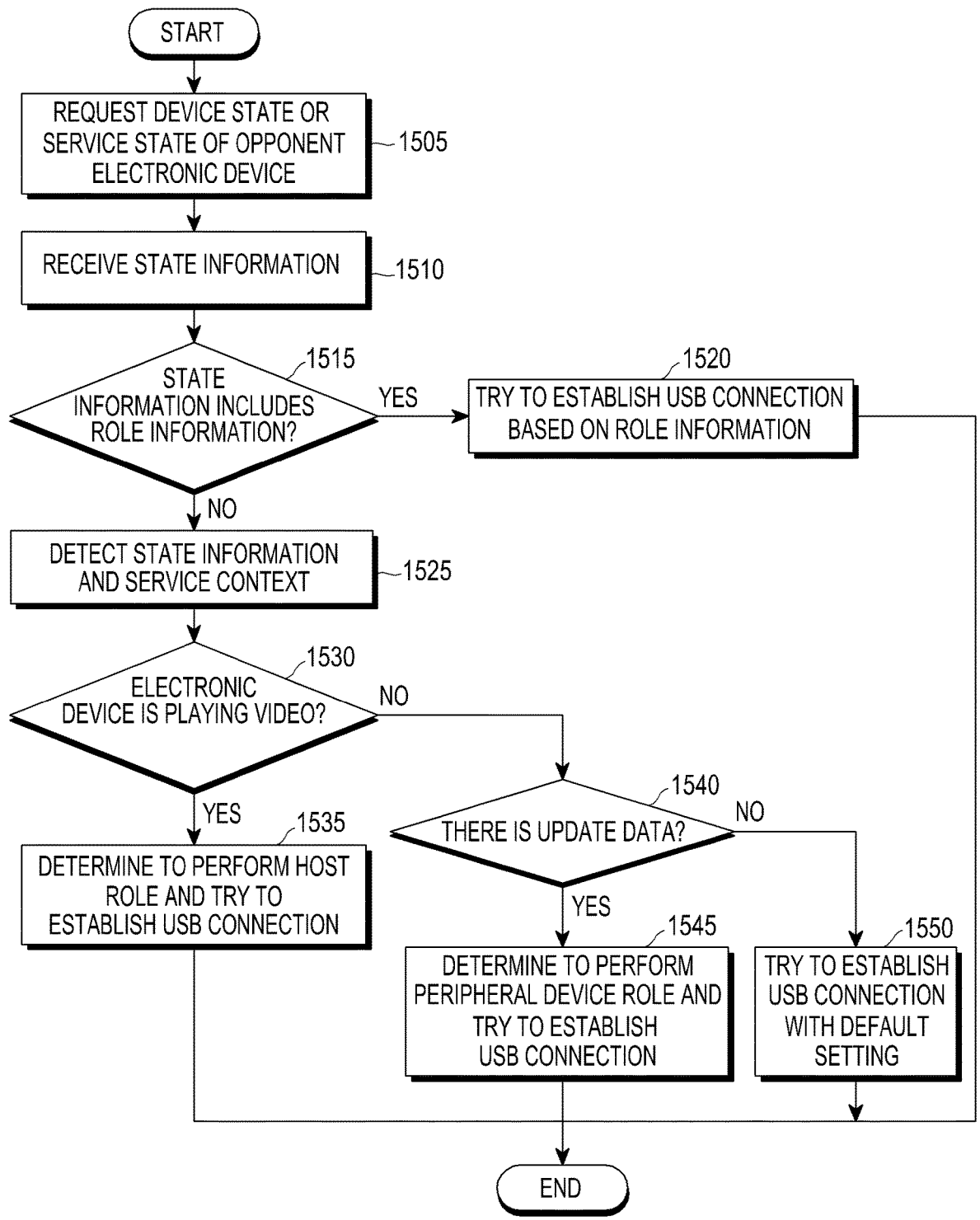
FIG. 15 illustrates an example of an operating process of an electronic device in a communication system according to an embodiment of the present disclosure.

FIG. 15 illustrates an example of an operating process of an electronic device in a communication system according to an embodiment of the present disclosure.

Referring to FIG. 15, an electronic device may be, for example, a mobile device, and an opponent electronic device may be, for example, a wireless docking pad. For example, an operation of an electronic device as described in FIG. 15 may be initiated by detecting start of wireless connection setup with the opponent electronic device in the electronic device. For example, an electronic device may start an operation in FIG. 15 by detecting a beacon signal transmitted from an opponent electronic device or receiving a confirmation signal in response to a beacon signal transmitted from the electronic device.

In FIG. 15, an electronic device request state information on a device state of an opponent electronic device or a service state of a service providable in the opponent electronic device for starting a connection with the opponent electronic device at operation 1505. Here, state information may include information necessary for determining a role of an electronic device. For example, state information on a device state may include at least one of information on other electronic devices connected to an opponent electronic device, i.e., the number of connections, a type of a connection, e.g., data backup, video streaming, and/or the like, and a role of the opponent electronic device for a corresponding role.

Further, state information on a service state may include at least one of types of services providable by an opponent electronic device, e.g., data backup, video streaming, and/or the like, an application which is using or may be used, and/or information on whether a video is played. In another embodiment of the present disclosure, operation 1505 may be omitted, and an electronic device may proceed to operation 1510 without request.

The electronic device receives state information from the opponent electronic device at operation 1510. The electronic device determines whether the state information includes role information indicating a role of the opponent electronic device at operation 1515. If the state information includes the role information, the electronic device determines a role of the electronic device for the wireless connection with the opponent electronic device based on the role information, and tries to establish a wireless connection with the opponent electronic device based on the determined role at operation 1520. For example, the wireless connection may be a wireless USB connection.

If the state information does not include the role information, the electronic device analyzes the state information, and detects a service context of the electronic device at operation 1525. The electronic device determines whether the electronic device is playing a video based on the service context at operation 1530.

If the electronic device is playing the video, the electronic device determines to perform a host role, and tries to establish a wireless connection with the opponent electronic device according to the determined role at operation 1535. The electronic device determines whether there is update data to be stored at the electronic device based on the state information at operation 1540. If there is the update data, the electronic device determines to perform a peripheral device role, and tries to establish a wireless connection with the opponent electronic device according to the determined role at operation 1545.

For another example, the electronic device recognizes that there are plurality of connections with the opponent electronic device based on the state information, and may determine a role of the electronic device for a wireless connection by performing operations 1530, 1535, 1540, and 1545 for each connection independently and separately.

Meanwhile, if a service sate or a device state necessary for determining a role such as video play or update data is not identified, the electronic device tries to establish a wireless connection with the opponent electronic device with default setting at operation 1550. The default setting may be determined as a host role or a peripheral device role according to a type of the electronic device and the opponent electronic device.

Although FIG. 15 illustrates an example of an operating process of an electronic device in a communication system according to an embodiment of the present disclosure, various changes could be made to FIG. 15. For example, although shown as a series of operations, various operations in FIG. 15 could overlap, occur in parallel, occur in a different order, or occur multiple times.

An example of an operating process of an electronic device in a communication system according to an embodiment of the present disclosure has been described with reference to FIG. 15, and another example of an operating process of an electronic device in a communication system according to an embodiment of the present disclosure will be described with reference to FIG. 16.

Figure 16:
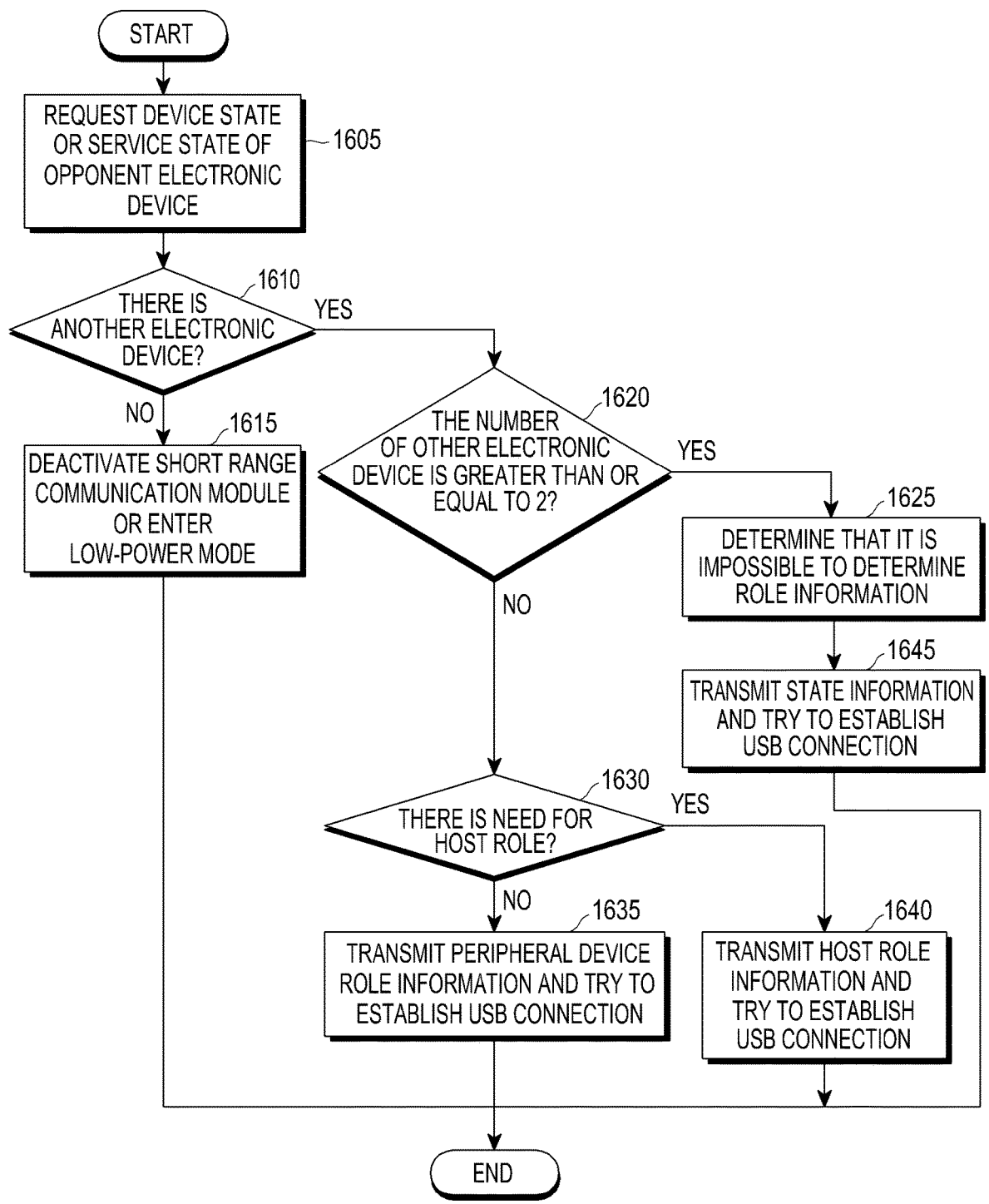
FIG. 16 illustrates another example of an operating process of an electronic device in a communication system according to an embodiment of the present disclosure.

FIG. 16 illustrates another example of an operating process of an electronic device in a communication system according to an embodiment of the present disclosure.

Referring to FIG. 16, an electronic device may be, for example, a wireless docking pad, and an opponent electronic device may be, for example, a mobile device. For example, an electronic device may start an operation in FIG. 16 by detecting a beacon signal transmitted from an opponent electronic device or receiving a confirmation signal in response to a beacon signal transmitted from the electronic device.

In FIG. 16, an electronic device receives a request for state information related to a device state of an opponent electronic device or a service state of a service providable in the opponent electronic device for starting a connection with the opponent electronic device at operation 1605. Here, state information may mean information necessary for determining a role of an electronic device. For example, state information on a device state may include at least one of information on other electronic devices connected to an opponent electronic device, i.e., the number of connections, a type of a connection, e.g., data backup, video streaming, and/or the like, and a role of the opponent electronic device for a corresponding role. Further, state information on a service state may include at least one of types of services providable by an opponent electronic device, e.g., data backup, video streaming, and/or the like, an application which is using or may be used, and/or information on whether a video is played. In another embodiment of the present disclosure, operation 1605 may be omitted, and an electronic device may proceed to operation 1610 without request.

The electronic device determines whether there is other electronic device connected to the electronic device, and identifies services providable to the opponent electronic device based on the connected electronic devices at operation 1610. If there is no electronic device connected to the electronic device, the electronic device determines that there is no need for a wireless connection, so the electronic device deactivate a communication interface of the electronic device or enters a low-power mode for operating on an idle state at operation 1615. The electronic device transmits, to the opponent electronic device, a signal indicating that there is no electronic device connected to the electronic device thereby the opponent electronic device stops setting up a wireless connection for a short range communication.

If there are the other electronic devices connected to the electronic device, the electronic device determines whether the number of the other electronic device is greater than or equal to 2 at operation 1620. If the number of the other electronic device is greater than or equal to 2, the electronic device determines that it is impossible to determine role information at operation 1625.

The electronic device includes information on electronic devices connectable to the opponent electronic device and information indicating that the electronic device may perform a host role and a peripheral role into state information to transmit the state information to the opponent electronic device, and tries to establish a wireless connection with the opponent electronic device at operation 1645. In this case, the electronic device receives state information indicating a role determined by the opponent electronic device to establish the wireless connection based on the state information.

If the number of the other electronic device is 1, the electronic device determines a role for a wireless connection according to a type of the other electronic device at operation 1630. For example, a display apparatus is connected to the electronic device through an image output port such as an HDMI, the electronic device may determine to perform a peripheral device role.

For another example, if an external hard disk is connected to the electronic device, the electronic device may determine to perform a host role. If the electronic device determines to perform a peripheral device role, the electronic device includes role information indicating the peripheral device role into state information to transmit the state information to the opponent electronic device, and tries to establish a wireless connection with the opponent electronic device based on the state information at operation 1635.

If the electronic device determines to perform a host role, the electronic device includes role information indicating the host role into state information to transmit the state information to the opponent electronic device, and tries to establish a wireless connection with the opponent electronic device based on the state information at operation 1640.

Although FIG. 16 illustrates another example of an operating process of an electronic device in a communication system according to an embodiment of the present disclosure, various changes could be made to FIG. 16. For example, although shown as a series of operations, various operations in FIG. 16 could overlap, occur in parallel, occur in a different order, or occur multiple times.

Another example of an operating process of an electronic device in a communication system according to an embodiment of the present disclosure has been described with reference to FIG. 16, and an example of a procedure of operating a wireless connection between electronic devices in a communication system according to an embodiment of the present disclosure will be described with reference to FIG. 17.

Figure 17:
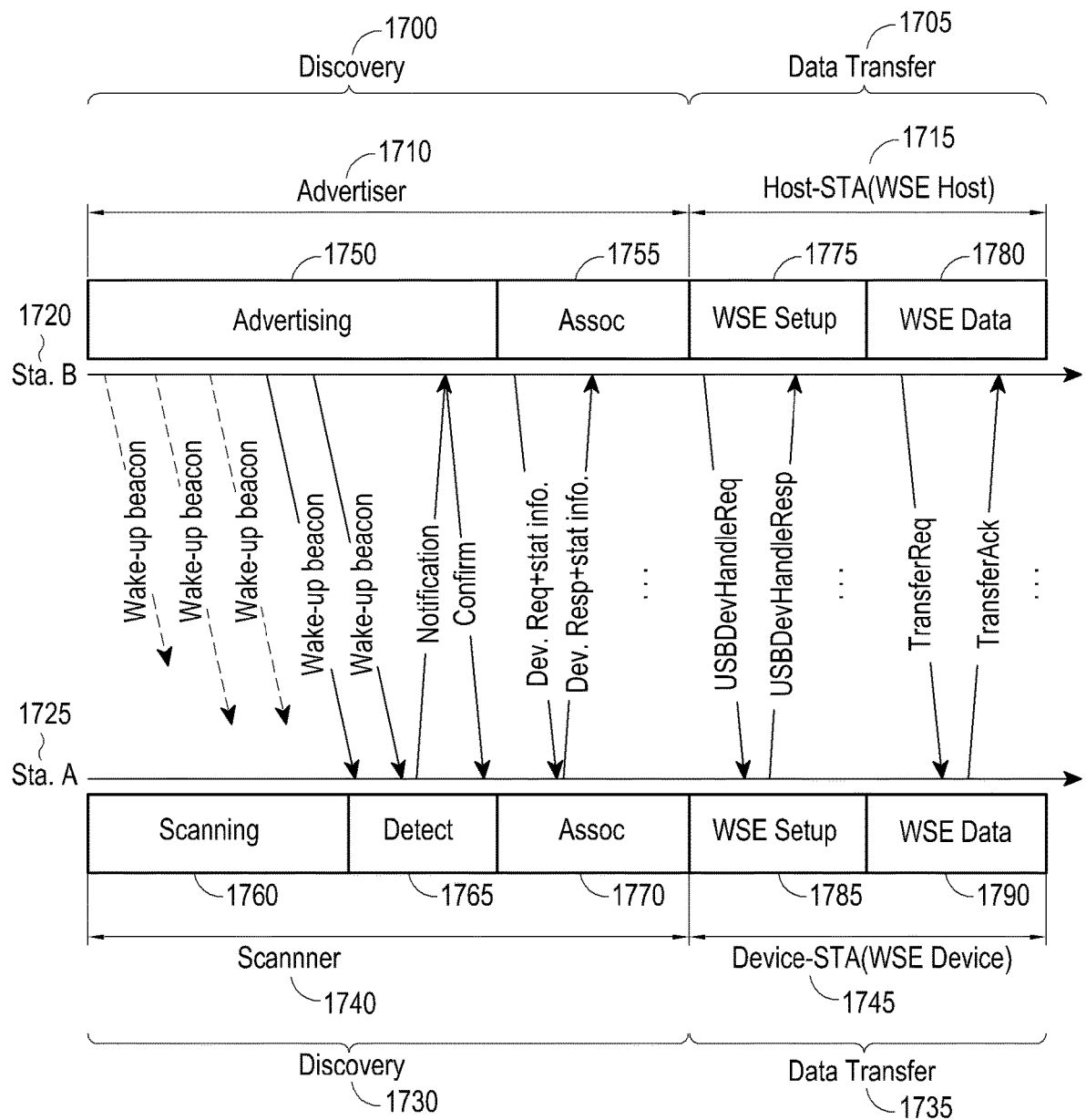
FIG. 17 illustrates a timing diagram of an example of a procedure of operating a wireless connection between electronic devices in a communication system according to an embodiment of the present disclosure.

FIG. 17 illustrates a timing diagram of an example of a procedure of operating a wireless connection between electronic devices in a communication system according to an embodiment of the present disclosure.

Referring to FIG. 17, it will be noted that a procedure of operating a wireless connection between electronic devices in FIG. 17 is a procedure of establishing a wireless USB connection and exchanging data between an STA A 1725 and an STA B 1720. In an example as shown in FIG. 17, the STA A 1725 operates as a peripheral device and the STA B 1720 operates as a host.

In FIG. 17, the STA B 1720 operates as an advertiser 1710 on a discovery state 1700, and operates as a host on a data transfer state 1705.

The STA A 1725 operates as a scanner 1740 on a discovery state 1730, and operates as a peripheral device on a data transfer state 1735. The discovery states 1700 and 1730 of the STAs B and A 1720 and 1725 are synchronized each other. Similarly, the data transfer states 1705 and 1735 are synchronized each other.

When the STA B 1720 starts operating as an advertiser 1710, the STA B 1720 performs an advertising function 1750. The advertising function 1750 includes repetitive transmission of a beacon signal for waking up an opponent electronic device.

When the STA A 1725 starts operating as a scanner 1740, the STA A 1725 performs a scanning function 1760 for detecting a beacon signal transmitted from an opponent electronic device. Upon detecting the beacon signal while performing the scanning function 1760, the STA A 1725 transmits a notification signal to the STA B 1720 according to a detection function 1765. The STA B 1720 transmits a confirmation signal as a response signal to the notification signal.

According to exchange of the notification signal and the confirmation signal, the STA A 1725 and the STA B 1720 perform association functions 1755 and 1770. The STA B 1720 transmits a device information request (Dev.Req) message to the STA A 1725 according to the association function 1755. At this time, the Dev.Req message may include state information. The state information is required for determining a role of a wireless connection between the STA A 1725 and the STA B 1720, and may include, for example, information necessary for determining a role of the STA A 1725 in the STA A 1725 or role information indicating a role which the STA B 1720 instructs the STA A 1725 to perform. For example, the role information may instruct the STA A 1725 to perform a peripheral device role or indicate that the STA B 1720 determined to perform a host role. For example, the state information may indicate a device state and/or a service state of the STA B 1720.

The STA A 1725 transmits, to the STA B 1720, a device information response (DEV.Resp) message in response to the Dev.Req message according to the association function 1770. The DEV.Resp message may include state information. The state information is required for determining a role of a wireless connection between the STA A 1725 and the STA B 1720, and may include, for example, information necessary for determining a role of the STA B 1720 in the STA B 1720 or role information indicating a role which the STA A 1725 instructs the STA B 1720 to perform. For example, the role information may instruct the STA B 1720 to perform a host role or indicate that the STA A 1725 performs a peripheral device role. For example, the state information may indicate a device state and/or a service state of the STA B 1720.

The STA B 1720 operates as a host station (Host-STA) 1715 on a data transfer state 1705. That is, the STA B 1720 transmits a USB device handle request (USBDevHandleReq) message for setting up a wireless connection, e.g., a WSE connection at operation 1775. The STA A 1725 operates as a device station (Device-STA) 1745 on a data transfer state 1735. The STA A 1725 receives, from the STA B 1720, a USBDevHandleReq message for setting up a wireless connection, e.g., a WSE connection at operation 1785, and transmits, to the STA B 1720, a USB device handle response (USBDevHandleResp) message.

The STA B 1720 operating as the Host-STA 1715 during the data transfer state 1705 includes data into a transfer request (TransferReq) message to transmit the TransferReq message at operation 1780. The STA A 1725 receives the data and responds with a transfer Ack (TransferAck) message at operation 1790.

An example of a procedure of operating a wireless connection between electronic devices in a communication system according to an embodiment of the present disclosure has been described with reference to FIG. 17, and another example of a procedure of operating a wireless connection between electronic devices in a communication system according to an embodiment of the present disclosure will be described with reference to FIG. 18.

Figure 18:
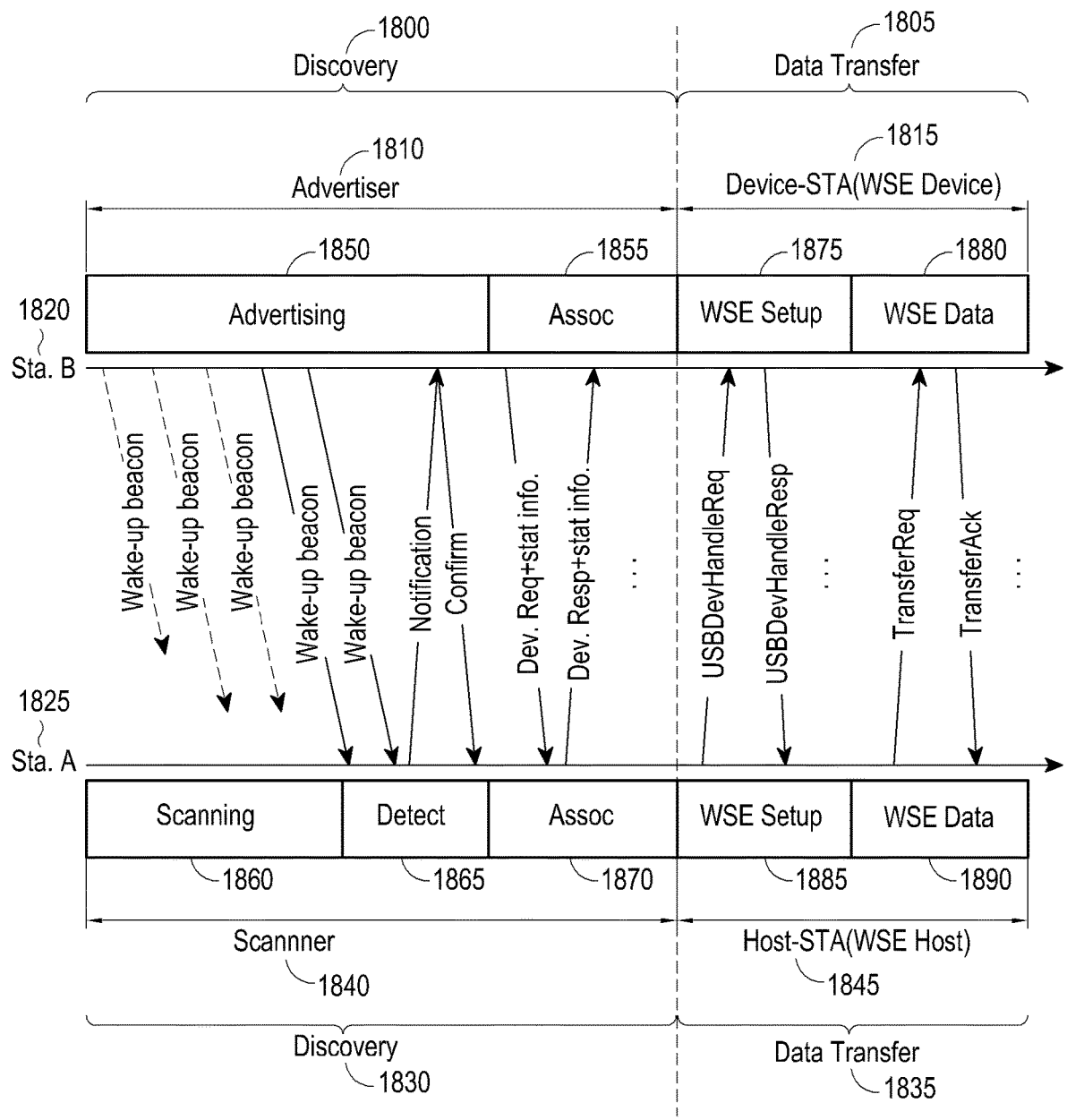
FIG. 18 illustrates a timing diagram of another example of a procedure of operating a wireless connection between electronic devices in a communication system according to an embodiment of the present disclosure.

FIG. 18 illustrates a timing diagram of another example of a procedure of operating a wireless connection between electronic devices in a communication system according to an embodiment of the present disclosure.

Referring to FIG. 18, a procedure of operating a wireless connection between electronic devices is a procedure of establishing a wireless USB connection and exchanging data between an STA A 1825 and an STA B 1820. In an example as shown in FIG. 18, the STA A 1825 operates as a host and the STA B 1820 operates as a peripheral device.

In FIG. 18, the STA B 1820 operates as an advertiser 1810 on a discovery state 1800, and operates as a peripheral device on a data transfer state 1805. The STA A 1825 operates as a scanner 1840 on a discovery state 1830, and operates as a host on a data transfer state 1835. The discovery states 1800 and 1830 of the STAs B and A 1820 and 1825 are synchronized each other. Similarly, the data transfer states 1805 and 1835 are synchronized each other.

When the STA B 1820 starts operating as an advertiser 1810, the STA B 1820 performs an advertising function 1850. The advertising function 1850 includes repetitive transmission of a beacon signal for waking up an opponent electronic device. When the STA A 1825 starts operating as a scanner 1840, the STA A 1825 performs a scanning function 1860 for detecting a beacon signal transmitted from an opponent electronic device. Upon detecting a beacon signal while performing the scanning function 1860, the STA A 1825 transmits a notification signal to the STA B 1820 according to a detecting function 1865. The STA B 1820 transmits a confirmation signal as a response signal to the notification signal.

According to exchange of the notification signal and the confirmation signal, the STA A 1825 and the STA B 1820 perform combination functions 1855 and 1870. The STA B 1820 transmits a device information request (Dev.Req) message to the STA A 1825 according to the combination function 1855. The Dev.Req message may include state information. The state information is required for determining a role of a wireless connection between the STA A 1825 and the STA B 1820. For example, the state information may include information required for determining a role of the STA A 1825 in the STA A 1825, or role information for a role instructed by the STA B 1820 to the STA A 1825. For example, the state information may indicate that the STA A 1825 needs to perform a host role, or may indicate that the STA B 1820 is determined to perform a peripheral device role. For example, the state information may indicate a device state and/or a service state of the STA B 1820.

The STA A 1825 transmits a device information response (DEV.Resp) message as a response message the Dev.Req message to the STA B 1820 according to the combination function 1870. The DEV.Resp message may include state information. The state information is required for determining a role of a wireless connection between the STA A 1825 and the STA B 1820. For example, the state information may include information required for determining a role of the STA B 1820 in the STA B 1820, or role information for a role instructed by the STA A 1825 to the STA B 1820. For example, the state information may indicate that the STA B 1820 needs to perform a peripheral device role, or may indicate that the STA A 1825 is determined to perform a host role. For example, the state information may indicate a device state and/or a service state of the STA B 1820.

The STA A 1825 operates as a host STA 1845 on a data transfer state 1805. The STA A 1825 transmits a USB device handling request (USBDevHandleReq) message for setting up a wireless connection, e.g., a WSE connection at operation 1845. The STA B 1820 operates as a device STA 1815 on a data transfer state 1805. The STA B 1820 receives a USBDevHandleReq message for setting up a wireless connection, i.e., a WSE connection from the STA A 1825 at operation 1875, and transmits a USB device handling response (USBDevHandleResp) message to the STA A 1825.

The STA A 1725 operating as a host STA 1745 during the data transfer state 1835 transmits a transfer request (TransferReq) message including data at operation 1890. The STA B 1720 receives the data and responds with a transfer acknowledgement (TransferAck) message at operation 1880.

Another example of a procedure of operating a wireless connection between electronic devices in a communication system according to an embodiment of the present disclosure has been described with reference to FIG. 18, and an inner structure of devices of establishing a wireless connection in a communication system according to an embodiment of the present disclosure will be described with reference to FIG. 19.

Figure 19:
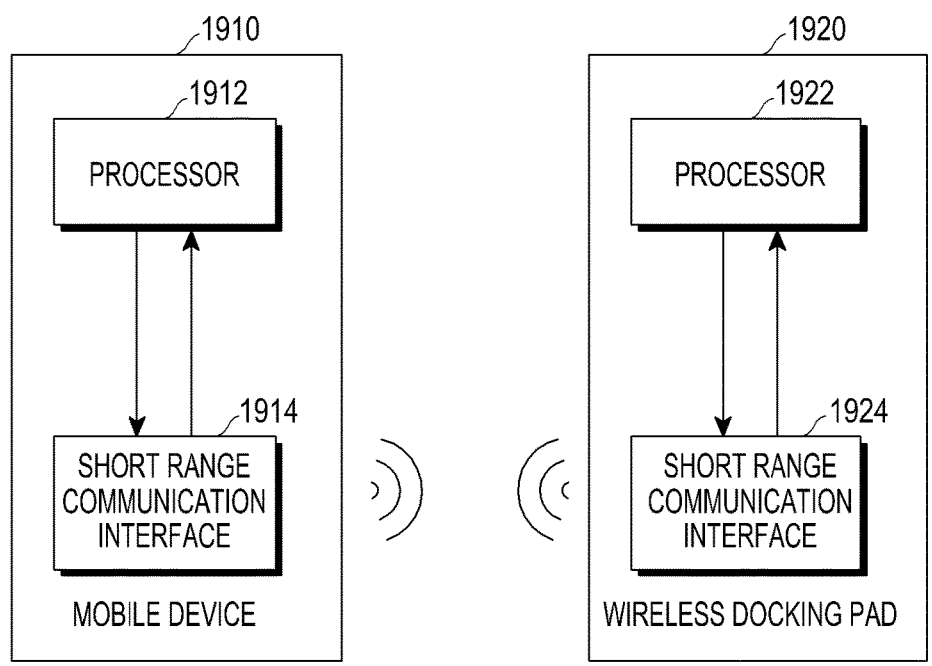
FIG. 19 illustrates an inner structure of devices of establishing a wireless connection in a communication system according to an embodiment of the present disclosure.

FIG. 19 illustrates an inner structure of devices of establishing a wireless connection in a communication system according to an embodiment of the present disclosure.

Referring to FIG. 19, devices 1910 and 1920 may be, for example, a mobile device and a wireless docking pad.

In FIG. 19, the device 1910 at least includes a processor 1912 and a short range communication interface 1914.

The short range communication interface 1914 transmits and receives signals and messages for establishing a wireless connection for a short range communication, and the processor 1912 determines a role for a wireless connection of the short range communication interface 1914, or transmits state information necessary for determining the role to an opponent device 1920 through the short range communication interface 1914, or receives the state information necessary for determining the role from the opponent device 1920 through the short range communication interface 1914.

The wireless docking pad 1920 at least includes a processor 1922 and a short range communication interface 1924.

The short range communication interface 1924 transmits and receives signals and messages for establishing a wireless connection for a short range communication, and the processor 1922 determines a role for a wireless connection of the short range communication interface 1924, or transmits state information necessary for determining the role to an opponent device 1910 through the short range communication interface 1924, or receives the state information necessary for determining the role from the opponent device 1910 through the short range communication interface 1924.

While the processor 1912 and the short range communication interface 1914 are described in the mobile device 1910 as separate units, it is to be understood that this is merely for convenience of description. In other words, the processor 1912 and the short range communication interface 1914 may be incorporated into a single unit.

The mobile device 1910 may be implemented with at least one processor.

While the processor 1922 and the short range communication interface 1924 are described in the wireless docking pad 1920 as separate units, it is to be understood that this is merely for convenience of description. In other words, the processor 1922 and the short range communication interface 1924 may be incorporated into a single unit.

The wireless docking pad 1920 may be implemented with at least one processor.

Various embodiments of the present disclosure may exchange information for an automatic connection by selectively determining a role of an electronic device while connecting a wireless communication, and support a role changing function according to a service of each connection device.

Further, a user' device may be automatically connected to an external hard disk to back up data in a case that data, e.g., a picture, a video, and/or the like is updated at the user's mobile device, or may be automatically connected to a display device to play a video to the display device in a case that a wireless connection is set up while the video is played, so the user's convenience becomes increased.

As is apparent from the foregoing description, an embodiment of the present disclosure enables to perform a short range wireless communication in a communication system.

An embodiment of the present disclosure enables to substitute a wired USB connection with a wireless connection using a wireless communication technology in a communication system.

An embodiment of the present disclosure enables to communicate information for determining a role of a USB in a procedure of establishing a wireless connection in a communication system.

An embodiment of the present disclosure enables to automatically determine a role of an electronic device upon establishing a wireless connection for a short range communication and to establish a service connection in a communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet).The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like).A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a first device in a communication system, the method comprising:
    detecting a second device to establish a wireless connection with the second device;
    transmitting, to the second device, a confirmation message;
    receiving, from the second device, service information of the second device during establishing the wireless connection;
    determining a role of the first device as a host device based on the service information of the second device and a state of service context of the first device; and
    communicating, based on the determined role as the host device, with the second device through the wireless connection,
    wherein the service information includes at least one of information on another device connected to the second device or a role of the second device,
    wherein the state of service context includes at least one of a type of a service provided by the first device or an application that is used by the first device, and
    wherein the first device has two role stacks for providing a host role as the host device and a peripheral role as a connection device operated under a control of the host device.

2. The method of claim 1, further comprising:
    determining the role of the first device as the connection device for delivering data to a peripheral device connected to the first device, based on the first device supporting to store the data; and
    communicating, based on the determined role as the connection device, with the second device through the wireless connection.

3. The method of claim 1, further comprising:
    determining the role of the first device as the connection device for delivering streaming data to a peripheral device connected to the first device based on the service information indicating that there is the streaming data to the peripheral device; and
    communicating, based on the determined role as the connection device, with the second device through the wireless connection.

4. The method of claim 1, further comprising:
    determining the role of the first device as the connection device for delivering streaming data to a peripheral device connected to the first device and comprising a port function based on the first device supporting to play the streaming data; and
    communicating, based on the determined role as the connection device, with the second device through the wireless connection.

5. The method of claim 1, further comprising:
    during maintaining the wireless connection, detecting whether the service information of the second device or connection ports of the first device for the wireless connection is changed;
    determining a new role of the first device during establishing a new wireless connection; and
    communicating, based on the determined new role, with the second device through the new wireless connection.

6. A method of a second device in a communication system, the method comprising:
    transmitting a beacon signal to establish a wireless connection;
    if a confirmation message is received from a first device in response to transmitting the beacon signal, transmitting, to the first device, service information of the second device;
    receiving, from the first device, at least one of service information of the first device or connection information of the first device during establishing the wireless connection;
    determining a role of the second device as a host device based on the service information of the first device and a state of service context of the second device; and
    communicating, based on the determined role, with the second device through the wireless connection,
    wherein the service information includes at least one of information on another device connected to the second device or a role of the second device, and
    wherein the state of service context includes at least one of a type of a service provided by the first device or an application that is used by the first device, and
    wherein the first device has two role stacks for providing a host role as the host device and a peripheral role as a connection device operated under a control of the host device.

7. The method of claim 6, further comprising:
    determining the role of the second device as the connection device for delivering data to a peripheral device connected to the second device based on the second device supporting to store the data; and
    communicating, based on the determined role as the connection device, with the first device through the wireless connection.

8. The method of claim 6, further comprising:
    determining the role of the second device as the connection device delivering streaming data to a peripheral device connected to the second device based on the service information indicating that there is the streaming data to the peripheral device; and
    communicating, based on the determined role as the connection device, with the first device through the wireless connection.

9. The method of claim 6, wherein further comprising:
    determining the role of the second device as the connection device for delivering streaming data to a peripheral device connected to the second device based on the second device supporting to play the streaming data; and
    communicating, based on the determined role as the connection device, with the first device through the wireless connection.

10. The method of claim 6, further comprising:
    during maintaining the wireless connection, detecting whether the service information of the second device or connection ports of the first device for the wireless connection is changed;

determining a new role of the second device during establishing a new wireless connection; and communicating, based on the determined new role, with the second device through the new wireless connection.

11. A first device in a communication system, the first device comprising:
a processor configured to
detect a second device to establish a wireless connection; and
a transceiver operably connected to the processor, the transceiver configured to transmit, to the second device, a confirmation message,
wherein:
the processor is further configured to determine a role of the first device as a host device based on service information of the second device and a state of service context of the first device; and
the transceiver is further configured to:
receive, from the second device, the service information of the second device during establishing the wireless connection; and
communicate, based on the determined role, with the second device through the wireless connection,
wherein the service information includes at least one of information on another device connected to the second device or a role of the second device,
wherein the state of service context includes at least one of a type of a service provided by the first device or an application that is used by the first device, and
wherein the first device has two role stacks for providing a host role as the host device and a peripheral role as a connection device operated under a control of the host device.

12. The first device of claim 11, wherein the processor is further configured to:
determine the role of the first device as the connection device for delivering data to a peripheral device connected to the first device based on the second device supporting to store the data; and
control the transceiver to communicate, based on the determined role as the connection device, with the second device through the wireless connection.

13. The first device of claim 11, wherein the processor is further configured to:
determine the role of the first device as the connection device for delivering streaming data to a peripheral device connected to the first device based on the service information indicating that there is the streaming data to the peripheral device; and
control the transceiver to communicate, based on the determined role as the connection device, with the second device through the wireless connection.

14. The first device of claim 11, wherein the processor is further configured to:
determine the role of the first device as the connection device for delivering the streaming data to a peripheral device connected to the first device and comprising a port function based on the first device supporting to play the streaming data; and
control the transceiver to communicate, based on the determined role as the connection device, with the second device through the wireless connection.

15. The first device of claim 11, wherein, during maintaining the wireless connection, the processor is further configured to:

detect whether the service information of the second device or connection ports of the first device for the wireless connection is changed;
determine a new role of the first device during establishing a new wireless connection; and
control the transceiver to communicate, based on the determined new role, with the second device through the new wireless connection.

16. A second device in a communication system, the second device comprising:
a transceiver configured to:
transmit a beacon signal to establish a wireless connection;
if a confirmation message is received from a first device in response to transmitting the beacon signal, transmit, to the first device, service information of the second device; and
receive, from the first device, at least one of service information of the first device or connection information of the first device during establishing the wireless connection; and
a processor operably connected to the transceiver, the processor configured to:
determine a role of the second device as a host device based on the service information of the first device and a state of service context of the second device; and
control the transceiver to communicate, based on the determined role, with the second device through the wireless connection,
wherein the service information includes at least one of information on another device connected to the second device or a role of the second device,
wherein the state of service context includes at least one of a type of a service provided by the first device or an application that is used by the first device, and
wherein the first device has two role stacks for providing a host role as the host device and a peripheral role as a connection device operated under a control of the host device.

17. The second device of claim 16, wherein the processor is further configured to:
determine the role of the second device as the connection device for delivering data to a peripheral device connected to the first device based on the first device supporting to store the data; and
control the transceiver to communicate, based on the determined role as the connection device, with the first device through the wireless connection.

18. The second device of claim 16, wherein the processor is further configured to:
determine the role of the second device as the connection device delivering streaming data to a peripheral device connected to the second device based on the service information indicating that there is the streaming data to the peripheral device; and
control the transceiver to communicate, based on the determined role as the connection device, with the first device through the wireless connection.

19. The second device of claim 16, wherein the processor is further configured to:
determine the role of the second device as the connection device for delivering streaming data to a peripheral device connected to the second device based on the second device supporting to play the streaming data; and control the transceiver to communicate, based on the determined role as the connection device, with the first device through the wireless connection.

20. The second device of claim 16, wherein during maintaining the wireless connection, the processor is further configured to:
- detect whether the service information of the second device or connection ports of the first device for the wireless connection is changed;
- determine a new role of the second device during establishing a new wireless connection; and
- control the transceiver to communicate, based on the determined new role, with the second device through the new wireless connection.

* * * * *